United States Patent [19]
Said

[11] Patent Number: 4,956,842
[45] Date of Patent: Sep. 11, 1990

[54] DIAGNOSTIC SYSTEM FOR A WATCHDOG TIMER

[75] Inventor: Waleed Said, Rockford, Ill.

[73] Assignee: Sundstrand Corporation, Rockford, Ill.

[21] Appl. No.: 272,059

[22] Filed: Nov. 16, 1988

[51] Int. Cl.$^5$ .............................................. G06F 11/00
[52] U.S. Cl. .......................................... 371/62; 371/3; 371/16.3
[58] Field of Search ...................... 371/16.3, 62, 3, 12; 364/200 MS File, 900 MS File

[56] References Cited

U.S. PATENT DOCUMENTS

| | | | |
|---|---|---|---|
| 3,749,897 | 7/1973 | Hirvela | 235/153 AK |
| 3,795,800 | 3/1974 | Nimmo et al. | 235/153 AK |
| 3,909,795 | 9/1975 | Chang et al. | 310/172.5 |
| 3,919,533 | 11/1975 | Einolf, Jr. et al. | 235/153 AC |
| 3,934,131 | 1/1976 | Perschy | 371/62 X |
| 4,405,982 | 9/1983 | Ruhnau et al. | 364/200 |
| 4,468,768 | 8/1984 | Sunkle | 371/3 X |
| 4,477,870 | 10/1984 | Kraus | 364/186 |
| 4,583,273 | 8/1985 | Lasser | 371/62 |
| 4,627,060 | 12/1986 | Huang et al. | 371/62 |
| 4,727,549 | 2/1988 | Tulpule | 371/16.3 X |
| 4,809,280 | 2/1989 | Shonaka | 371/62 |

Primary Examiner—Jerry Smith
Assistant Examiner—Robert W. Beausoliel
Attorney, Agent, or Firm—Antonelli, Terry, Stout & Kraus

[57] ABSTRACT

A system (10) is disclosed for testing a watchdog timer (22). The watchdog timer is associated with a system (14) which is controlled by a control program executed by a programmed processor (20) and which is monitored by a supervisory system (18) in which the watchdog timer generates an interruption signal (NMI) which interrupts the control program when the watchdog timer does not generate a reset signal within a time window measured from a last reset signal. The supervisory system contains a circuit coupled to the watchdog timer for initiating testing of the watchdog timer. The watchdog timer contains a circuit for disabling the generation of the interruption signal during testing of the watchdog timer. Furthermore, the watchdog timer contains a circuit for shutting down the system which is controlled by the control program when the control program does not resume normal operation in response to an interruption signal. The watchdog timer has a circuit for disabling the circuit for shutting down the system which is controlled by the control program during testing of the watchdog timer.

24 Claims, 6 Drawing Sheets

DIAGNOSTIC SYSTEM FOR A WATCHDOG TIMER

TECHNICAL FIELD

The present invention relates to watchdog timers used for detecting processor failures. More particularly, the present invention relates to a diagnostic system for a watchdog timer.

BACKGROUND ART

Watchdog timers are well known for detecting failures in processors. A watchdog timer is particularly useful for protecting processors against failures caused by noise induced software malfunctions which can cause control or protection malfunctions. A typical watchdog timer monitors software functions by producing a non-maskable interrupt when a reset pulse is not produced within a predetermined time interval. The reset pulse is typically produced cyclically by a monostable multivibrator during execution of the software by the processor when a fault condition does not exist. During normal operation, the watchdog timer is cleared by a reset signal before the watchdog timer times out. U.S. Pat. Nos. 3,795,800, 3,909,795, 3,919,533, 4,405,982, 4,477,870 and 4,538,273 disclose examples of timers utilized for monitoring the operation of processors. Patent No. 3,919,533 discloses a watchdog timer which periodically provides a code to a decoder network cyclically during an interval having a period shorter than a predetermined time interval of the timing network so that a fault is continuously inhibited as long as the code is continuously supplied with the desired periodicity. None of the aforementioned systems disclose testing procedures for watchdog timers.

In applications where critical functions are performed under the control of a programmed processor, such as aircraft power generating systems or control mechanisms for wing actuators, it is of importance to insure that the watchdog timer itself is operational. For example, electromagnetic interference (EMI) noise could produce a false reset pulse which would mask the presence of a malfunction in the watchdog timer. Furthermore, a line for coupling reset pulses to the processor could fail in a high state or the processor could be in a loop which is a fault condition which causes reset pulses to be sent continually within the cyclical time interval of the watchdog timer which masks the presence of a fault condition.

DISCLOSURE OF INVENTION

The present invention provides a system for testing the operability of a watchdog timer. With the invention, a test routine is initiated which disables the normal operation of the watchdog timer to provide the capability of testing the operability of the watchdog timer including individual circuit functions therein.

A testing system in accordance with the invention for a watchdog timer monitoring a programmed processor and associated with a system which is controlled by a control program executed by the programmed processor and which is monitored by a supervisory system with the watchdog timer generating an interruption signal which interrupts execution of the control program when the programmed processor does not generate a reset of the watchdog timer comprises a test initiator contained in the supervisory system coupled to the watchdog timer for initiating testing of the watchdog timer; and a disabling circuit contained in the watchdog timer for disabling the generation of the interruption signal during testing of the watchdog timer. The watchdog timer further comprises means for shutting down the system which is controlled by the control program when the control program does not resume normal operation in response to an interruption signal; and the watchdog timer has a disabling circuit for disabling the disabling circuit for shutting down the system which is controlled by the control program during testing of the watchdog timer. Furthermore, a transmission system is provided for coupling the watchdog timer to the supervisory system for transmitting results of the testing of the watchdog timer to the supervisory system.

A decoder is coupled to the processor for decoding words transmitted from the processor which generates a reset of the watchdog timer in response to decoding a predetermined sequence of words and which is coupled to the transmission system for transmitting a signal to the supervisory system in response to decoding the predetermined sequence of words. Furthermore, a reset latch, responsive to a clock signal received from the programmed processor and a data input of a signal indicating that the predetermined sequence of words has been received is provided for generating the reset in response to a simultaneous occurrence of the clock signal and the signal indicating that the predetermined sequence of words has been received. The decoder comprises a plurality of gates equal in number to a number of words which are contained in the predetermined sequence with each gate having a plurality of inputs coupled to the processor for respectively receiving bits contained in each word; a plurality of latches equal in number to a number of the gates for respectively receiving bits contained in each word, each latch respectively having an input causing any data of a first level which is present on a data input to be latched and an input coupled to the reset generated by the reset latch, each latch having an output with the outputs being coupled to a gate which produces an output signal of a first level in response to outputs from the latches of a first level being simultaneously present, a data input of a first latch of the plurality of latches being coupled to a constant level signal with the output of the first latch being coupled to a data input of a first latch of a group of at least one latch of the plurality of latches with the output of each of the group of latches being coupled to a data input of another of a group of latches except for a last latch within the group which does not have a data output coupled to a data input of a latch in the group of latches, a first gate having a pair of inputs with the first input being coupled to the output of the gate which produces the output signal of a first level and a second input being coupled to a signal indicating that the watchdog timer is being tested. The first gate produces an output signal which is the data input of the latch generating the reset signal with the first gate producing a data signal of a first level in response to the signal indicating that the watchdog timer is being tested is not present and the predetermined sequence of words being present, a second gate having a pair of inputs with the first input of the second gate being coupled to the output of the gate which produces an output signal of a first level and a second input of the second gate being coupled to a signal indicating that the watchdog timer is being tested and producing an output signal of a first level when both of the inputs have an identical level, and a test result storing latch having a constant level data input and an input of the output of the second gate for producing an output identical to the data input in response to the output signal of the second gate being a first level and an input coupled to the signal indicating that the watchdog timer is being tested for resetting the test results storing latch at an end of the signal indicating that the watchdog timer is being tested, the output of the test result storing latch being coupled to the transmission system.

Furthermore, an interruption circuit is provided, coupled to the decoder, for controlling the interruption of the control program with the interruption signal being produced when a reset signal is not produced inside a time window measured with respect to a previous reset pulse. A circuit is provided, coupled to the transmitter for signalling the supervisory system when a reset pulse is generated before the time window; and a circuit for disabling is provided, responsive to the circuit for initiating testing, for disabling the transmission system for signalling the supervisory system when a reset pulse is generated before the time window and signalling the supervisory system if a malfunction exists during testing of the circuit for signalling the supervisory system when a reset pulse is detected before the time window. Furthermore, a circuit is provided, coupled to the transmission system for transmitting, for signalling the supervisory system when a reset pulse is generated after the time window; and a disabling circuit is provided, responsive to the test initiator for initiating testing, for disabling the circuit for signalling the supervisory system when a reset pulse is generated after the time window and signalling the supervisory system if a malfunction exists during testing of the circuit for signalling the supervisory system when a reset pulse is generated after the time window.

The circuit for disabling and signalling comprises a time window gate having a pair of inputs and an output, the first input having a first level in response to a reset pulse being produced before the time window and a second level in response to a reset not occurring before the time window, the second input being high in response to a reset not occurring by the end of the time window, the output being high when either a reset occurs before the time window or not occurring by an end of the time window.

A testing system for a watchdog timer which monitors operation of a programmed processor with the watchdog timer having a circuit for generating an interruption signal to interrupt execution of a program by the programmed processor in accordance with the present invention includes an initiation circuit, coupled to the watchdog timer for initiating testing of the watchdog timer; and a disabling circuit for disabling the generation of an interruption signal by the circuit for generating an interruption signal during testing of the watchdog timer which disables interruption of execution of a program by the programmed processor by the watchdog timer. Furthermore, a system is controlled by execution of the control program executed by the programmed processor, and a circuit is provided for shutting down the system which is controlled by the control program when the control program does not resume normal operation in response to an interruption signal and the watchdog timer has a circuit for disabling the circuit for shutting down the system which is controlled by the control program during testing of the watchdog timer.

BEST MODE FOR CARRYING OUT THE INVENTION

Figure 1:
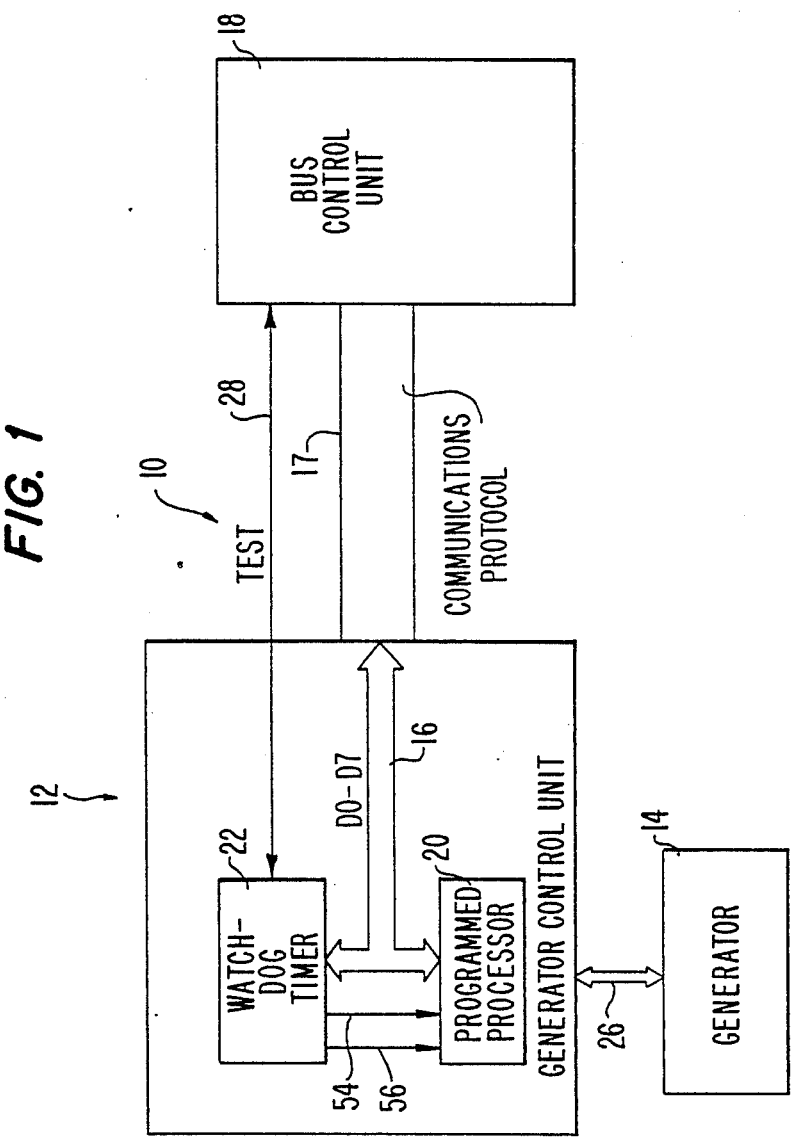
FIG. 1, is a block diagram of a testing system for a watchdog timer in accordance with the invention.

FIG. 1 illustrates a block diagram of a testing system for a watchdog timer in accordance with the invention. The testing system 10 is associated with a system such as an electrical power generating system in an airframe having a number of generators which synchronously generate three phase electrical power. As illustrated, one or more generator control units 12 each control an associated generator 14 of electrical power with only a single generator control unit and associated generator being illustrated to simplify the illustration. A bidirectional data bus 16 having an eight bit capacity couples programmed processor 20 to watchdog timer 22 and interfaces with a communications protocol 17. Programmed processor 20 may be any form of programmed processor including a microprocessor. The communications protocol 17 functions as a transmission system which connects each generator control unit 12 to a communications bus control unit 18. The communications protocol may be any transmission protocol but in an airframe may be the ANRIC 429 protocol. In a typical configuration, the bus control unit 18 controls the communications between a plurality of generator control units 12. Systems of the aforementioned type are conventionally in use in multiple engine airframes and therefore will not be described herein in detail. Watchdog timer 22 functions to monitor the functioning of the programmed processor 20. The watchdog timer 22 as described hereinafter may be implemented in any suitable form including a single programmable logic device. Communications between the programmed processor 20 and the watchdog timer 22 are transmitted over bidirectional bus 16. During normal operation, a sequence of programmed key words is sent from the programmed processor 20 to the watchdog timer 22 over data bus 16. If the watchdog timer 22 detects a predetermined sequence of key words measured from a last reset pulse generated by the watchdog timer 22 within a predetermined time window, then the watchdog timer is reset which is the normal mode of operation. However, if the predetermined sequence of key words is not received within a predetermined time window as described hereinbelow, the watchdog timer 22 generates a non-maskable interrupt (NMI) which is transmitted to the programmed processor 20 on line 54. If two sequential non-maskable interrupts are generated, the watchdog timer generates a SHUTDOWN signal which is transmitted from the watchdog timer 22 to the programmed processor 20 on line 56 and the programmed processor is then disabled and the associated generator is tripped out of the electric system. Bus control 18 originates a TEST signal which is transmitted to the watchdog timer 22 over line 28. The TEST signal initiates a test sequence to determine the operational capability of the watchdog timer 22. The generation of the TEST signal by the bus control unit 18 causes the watchdog timer 22 to disable its normal mode of operation of generating the NMI and SHUTDOWN signals so that each of the functions of the watchdog timer 22 as described below may be checked to determine their operational capability. Thus, when the TEST signal goes high, the operational status of the watchdog timer 22 is determined without influencing the operation of the system. During the test procedure, data lines D0-D3 transmit status bits over the bus 16 to the programmed processor 20 to signal the bus control unit 18 of the operational status of each of the functional parts of the watchdog timer 22. It should be understood that the invention is not limited to any number of data lines used for transmitting status bits to the bus control unit 18.

Figure 2:
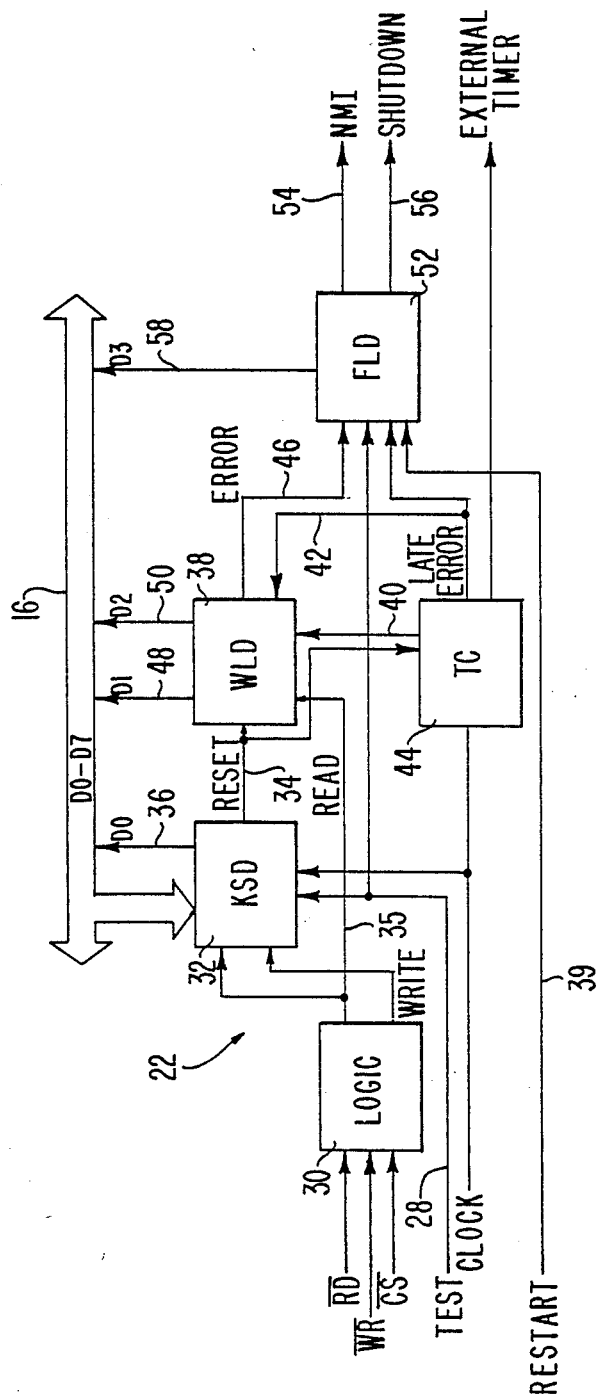
FIG. 2 is a block diagram of the functional parts of the watchdog timer of the present invention.
Figure 3:
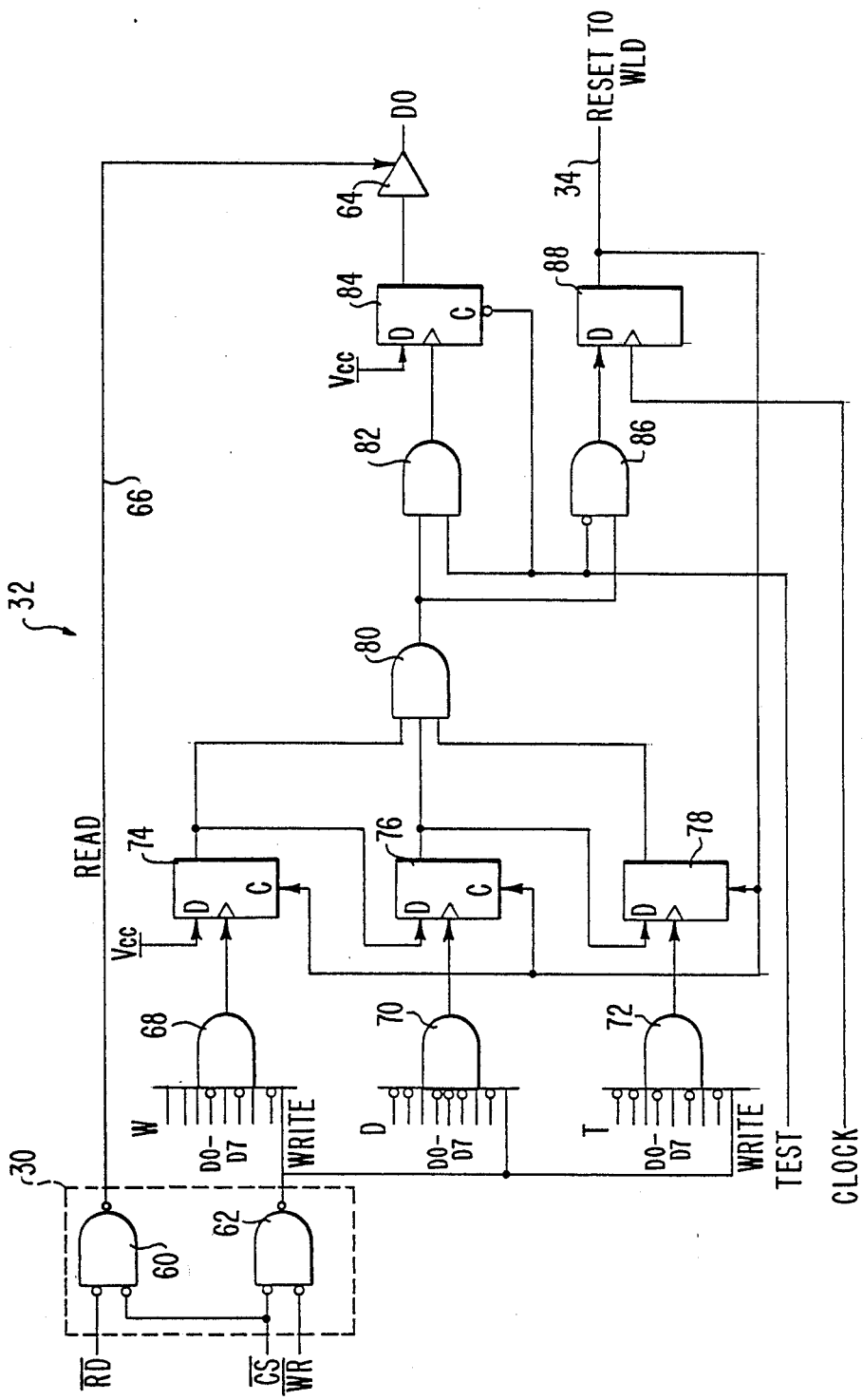
FIG. 3 is a block diagram of a key word sequence decoder (KSD) of FIG. 2.

FIG. 2 illustrates a block diagram of watchdog timer 22 which may be utilized with the practice of the present invention. It should be understood that the present invention is not limited to the implementation of the watchdog timer 22 illustrated in FIG. 2 with watchdog timers of different functional capability being readily usable with the present invention. Logic circuit 30 controls the decoding of the sequence of key words which are received from the processor 20 over the data bus 16. The logic circuit 30 consists of a pair of NOR gates as illustrated in FIG. 3. During normal operation, the programmed processor 20 sends out a predetermined sequence of key words over data bus 16 in a cyclical manner which if received and decoded in a proper time frame by the key word sequence decoder 32 (KSD), cause the generation of a reset pulse on line 34. One acceptable sequence of key words are the letters W, D and T encoded in ASCII code. The receipt of any other sequence of key words will prevent the generation of a reset signal on line 34. The KSD 32 is tested for malfunctions upon receipt of a TEST signal on line 28 which disables the generation of a reset signal on line 34 during testing. The operability of the KSD 32 is determined by the programmed processor 20 by monitoring the DO data line during testing and informing the BCU 18 of the test results over the communication protocol 17. During testing, the DO bit being high on line 36 signals that the predetermined sequence of words was received from the programmed processor 20 and the DO bit being low signals that the predetermined sequence of words was not received from the programmed processor. The results of the testing of the KSD 32 are coupled to the data bus 16 over output line 36. A window limits decoder (WLD) 38 tests the RESET signal generated on 34 to determine if it occurs within a time window measured with respect to the previous reset signal. In an embodiment of the present invention, the time window is 5 milliseconds in length with the receipt of a RESET signal from line 34 between 2.5 and 7.5 milliseconds measured from the last RESET signal being indicative of proper operation. The utilization of the 5 millisecond time window further precludes the possibility of random noise resulting in the resetting of the watchdog timer 22 as a consequence of the high improbability of the precise sequence of key words being received by the KSD 32 within the time window measured from the last reset pulse generated by the KSD 32. The WLD 38 respectively receives on line 40 a time reference signal which is generated 2.5 milliseconds after the receipt of the last RESET signal on line 34 and on line 42 a time reference signal which is generated 7.5 milliseconds after the receipt of the last RESET signal on line 34. A RESTART signal on line 39 functions to cause the system to remove the SHUTDOWN signal to cause the system to be restarted. The aforementioned signals on lines 40 and 42, respectively, define the time window which is utilized by the WLD 38 to determine if the RESET signal on line 34 is received in the desired time window. The aforementioned 2.5 and 7.5 millisecond signals received by the WLD 38 on lines 40 and 42 are generated by a timer counter (TC) 44 which is synchronized to the generation of the RESET on line 34. The TC 44 produces a time base which functions as an external timer. The WLD 38 functions to produce an ERROR signal on line 46 when a reset signal is not received on line 34 within the 5 millisecond time window measured between 2.5 and 7.5 milliseconds after the receipt of the last RESET signal on line 34. The operability of the WLD 38 is determined by the programmed processor 20 by monitoring the D1 and D2 data lines during testing. During operation, the D1 bit on line 48 being high signals that a RESET signal was produced less than 2.5 milliseconds from the last RESET signal and during operation, the D2 bit on line 50 being high signals that a RESET signal was not produced within 7.5 milliseconds from the last RESET signal. During operation, the D1 bit on line 48 being low signals that a RESET signal was not produced less than 2.5 milliseconds from the last RESET signal and during operation the D2 bit on line 50 being low signals that a RESET signal was produced within 7.5 milliseconds from the last RESET signal. During testing when the TEST signal on line 28 is high, the output lines 48 and 50, respectively transmit a low level signal to the data bus 16 if the KSD 32 is outputting the RESET signal words either before or after the aforementioned 5 millisecond time window. It should be understood that the present invention is not limited to the timing sequence described above with other timing sequences being within the scope of the invention. A fault level decoder (FLD) 52 functions to produce a NMI signal on output 54 upon receipt of an ERROR signal on line 46. Furthermore, the FLD 52 functions to produce a SHUTDOWN signal on output 56 upon the receipt of two ERROR signals on line 46 in sequence. The NMI signal is transmitted to the programmed processor 20 to force the programmed processor into an interrupt condition. The SHUTDOWN signal is transmitted to the programmed processor 20 to cause the operation of the programmed processor and the controlled generator 14 to be tripped off line. The operability of the FLD 52 is determined by the programmed processor 20 by monitoring the D3 data line 58 during testing. During operation, a high level bit on the D3 line 58 reflects the presence of an NMI or a shutdown and a low level D3 bit reflects the absence of a NMI or a shutdown. During testing, the FLD 52 outputs a status signal on line 58 to signal if the fault level decoder is operating properly. A high level signal indicates proper operation.

FIG. 3 illustrates a block diagram of the key word sequence decoder 22 and logic circuit 30 of FIG. 2. The logic circuit 30 consists of two NOR gates 60 and 62 which respectively output a READ signal which is applied to a tristate logic circuit 64 via line 66 and a WRITE signal which is applied to the key word sequence decoder 22. The $\overline{RD}$, $\overline{CS}$, $\overline{WR}$ signal inputs are generated by the programmed processor 20 in conventional fashion. The W, D and T inputs which are received from the data bus 16 are respectively decoded by AND gates 68, 70 and 72 which have suitable inverting inputs to ensure that the precise ASCII code respectively represented by the letters W, D and T will cause the outputs of the AND gates 68, 70 and 72 to go high. Three D-type flip-flops 74, 76, and 78, respectively, are used to latch the outputs of the AND gates 68, 70 and 72. The first latch 74 has a permanent high level data signal applied to its D input from the power supply potential $V_{CC}$. The output of the latch 74 is applied to the data input of the latch 76 and the output of the latch 76 is applied to the data input of latch 78. Accordingly, when the output of gate 68 goes high, high level data is latched into latch 74 which is applied to the data input of the latch 76. When the output of AND gate 70 goes high, the high level data state of the latch 76 is applied to the data input of the latch 78. When the output of the AND gate 72 goes high, the output state of the gate 76 is latched in the latch 78. When the correct sequence of words is decoded by the AND gates 68, 70 and 72, the output states of the latches 74, 76 and 78 are forced high to cause high level signals to be applied to AND gate 80 which produces a high level signal on its output. The output of AND gate 80 is applied to an AND gate 82 which also receives the TEST signal as a second input. During normal operation, the test signal is low which causes the output of AND gate 82 to be low. This prevents toggling of latch 84. The latch 84 is cleared by the inverted TEST signal so that the latch is only active during testing. If the output from the AND gate 82 is high during the presence of the TEST signal, a high level data signal will be outputted from the latch 84 which is passed by the tristate logic circuit 64 in response to the READ signal on line 66. AND gate 86 functions to produce a high level output signal during normal operation of the watchdog timer 22. When the TEST signal is low, the inverting input of the AND gate 86 is high which causes the output of the AND gate to go high in response to a high level signal from the AND gate 80. Latch 88 outputs the high level input received from AND gate 86 in response to a clock signal applied to the toggle input.

Figure 4:
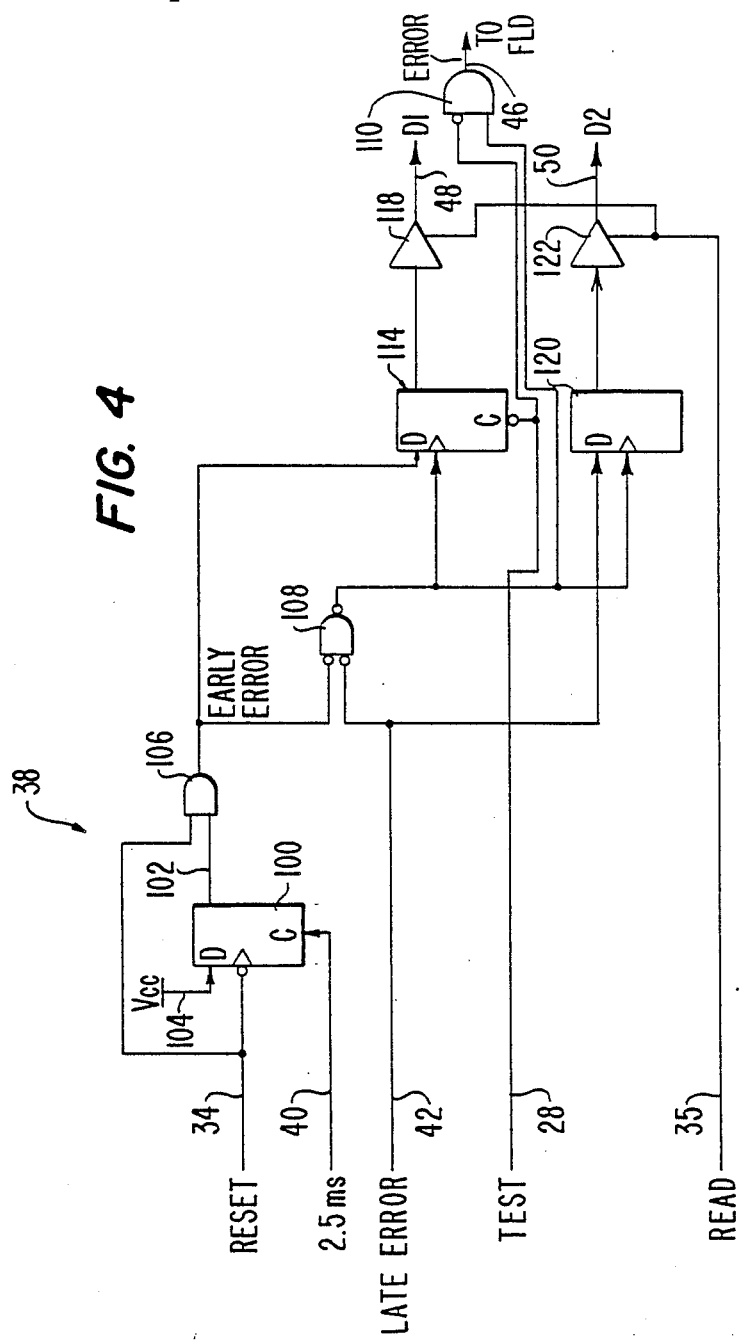
FIG. 4 is a block diagram of a window limits decoder (WLD) of FIG. 2.

FIG. 4 illustrates an implementation of the window limits decoder 38 of FIG. 2. Like reference numerals identify like parts. A latch 100 is clocked by the falling edge of the RESET signal received on line 34. A clear signal is applied to the latch 100 on line 40 which causes output 102 to go low 2.5 milliseconds after the last RESET signal. Power supply potential Vcc is applied on data input 104. The latch 100 functions such that when a RESET signal occurs, a flag is raised for 2.5 milliseconds on line 102. Any RESET signal produced while the 2.5 millisecond flag is high causes the output of AND gate 106 to go high. OR gate 108 functions as a time window gate to produce a high level output signal in response to inputs of either EARLY ERROR signal or a LATE ERROR signal. During normal operation when the RESET signal occurs within the 5 millisecond time window defined between 2.5 and 7.5 milliseconds after the last RESET signal, the output of OR gate 108 remains low. However, if the KSD 32 produces a RESET signal on line 34 either before or after the time window, AND gate 110 produces an ERROR signal as a consequence of the TEST signal being low during normal operation. However, during testing, when the TEST signal is high, the inverting input of the AND gate 110 causes the output to be locked in a low signal level which disables the generation of the NMI and SHUTDOWN signals by the FLD 52. Latch 114 is toggled by the output of OR gate 108 to cause a high level data signal represented by every EARLY ERROR signal to be applied to the data input. As a consequence of the output of the latch 114 being cleared in response to the low level of the TEST signal on line 28, a high level output signal applied to toggle the latch 114 causes a high level signal to be produced when the RESET signal has occurred earlier than 2.5 milliseconds after the last RESET signal. Tristate logic circuit 118 is enabled by the READ signal on line 35 to output a high level signal on line 48 indicating that the WLD 38 is functioning too rapidly. Latch 120 produces a high level signal on its output in response to operation of the WLD 38 functioning too slowly. A high level output signal is produced in response to the output from OR gate 108 being high which is applied to the toggle input and the LATE ERROR signal being simultaneously present. If the WLD 38 is operating properly, the output signal form the OR gate 108 goes low prior to the occurrence of the LATE ERROR signal on line 42 which prevents the output from the latch 120 going high. However, if the output goes high, tristate logic circuit 122 passes the high level date signal to line 50 in response to the occurrence of the READ signal on line 35. Lines 48 and 50 inform the programmed processor 20 of a malfunction.

Figure 5:
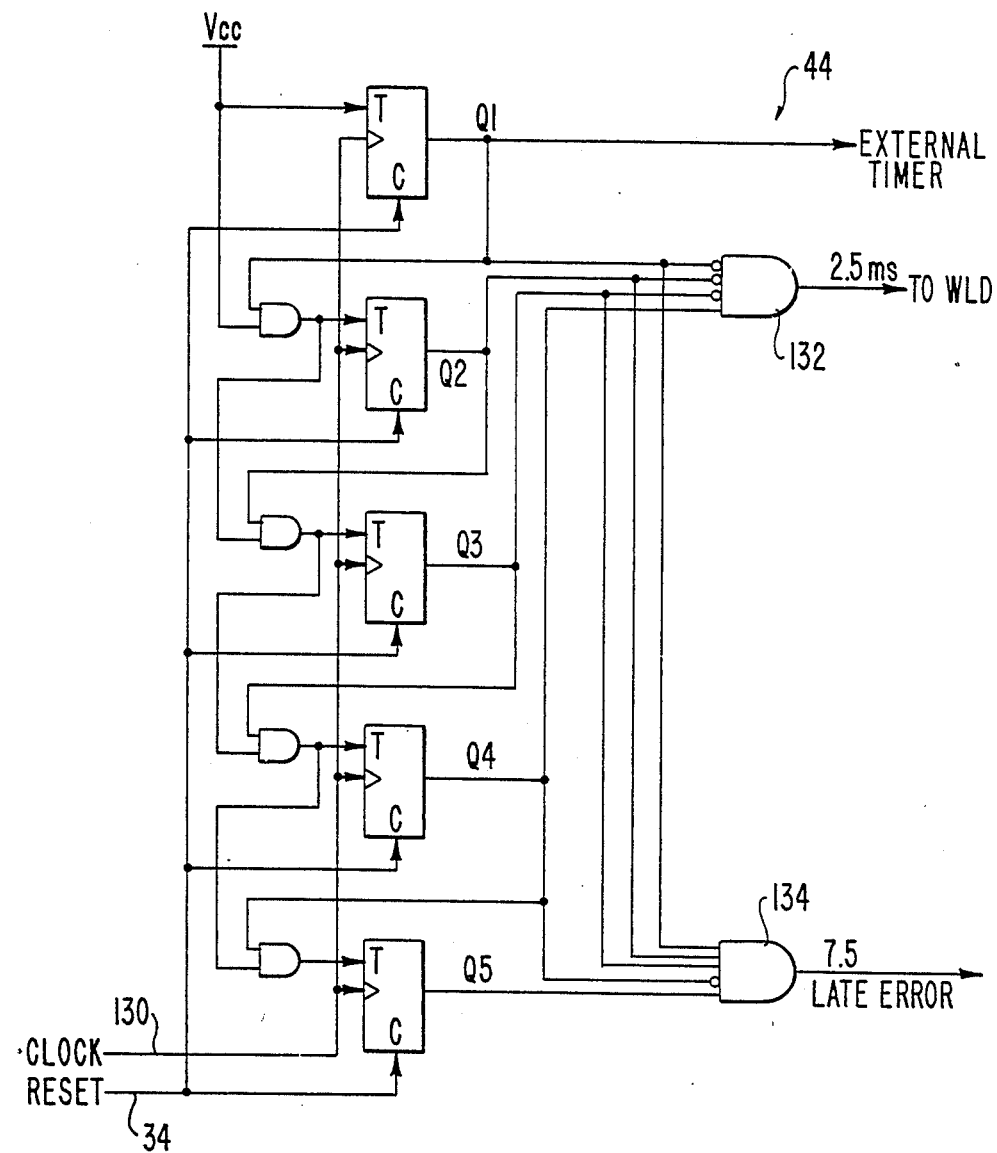
FIG. 5 is a block diagram of a timer for producing signals utilized by the window limits decoder of FIG. 4.

FIG. 5 illustrates the TC 44 of FIG. 2. A three kilohertz clock signal is applied on input 130. Five interconnected T-type latches Q1-Q5 function to count the clock pulses present in the clock signal on input 130. AND gate 132 having inverting inputs from the Q1, Q2, and Q3 latches and a non-inverting input from the Q4 latch produces an output signal 2.5 milliseconds after the receipt of the last RESET signal on line 34. AND gate 134 which has noninverting inputs which are received from the Q1, Q2, Q3 and Q5 latches and an inverting input from the Q4 latch produces an output signal 7.5 milliseconds after receipt of the RESET signal on line 34. The output from the Q1 latch is connected to an external timer which is activated during testing to test for the presence of the clock signal and the functionality of TC 44.

Figure 6:
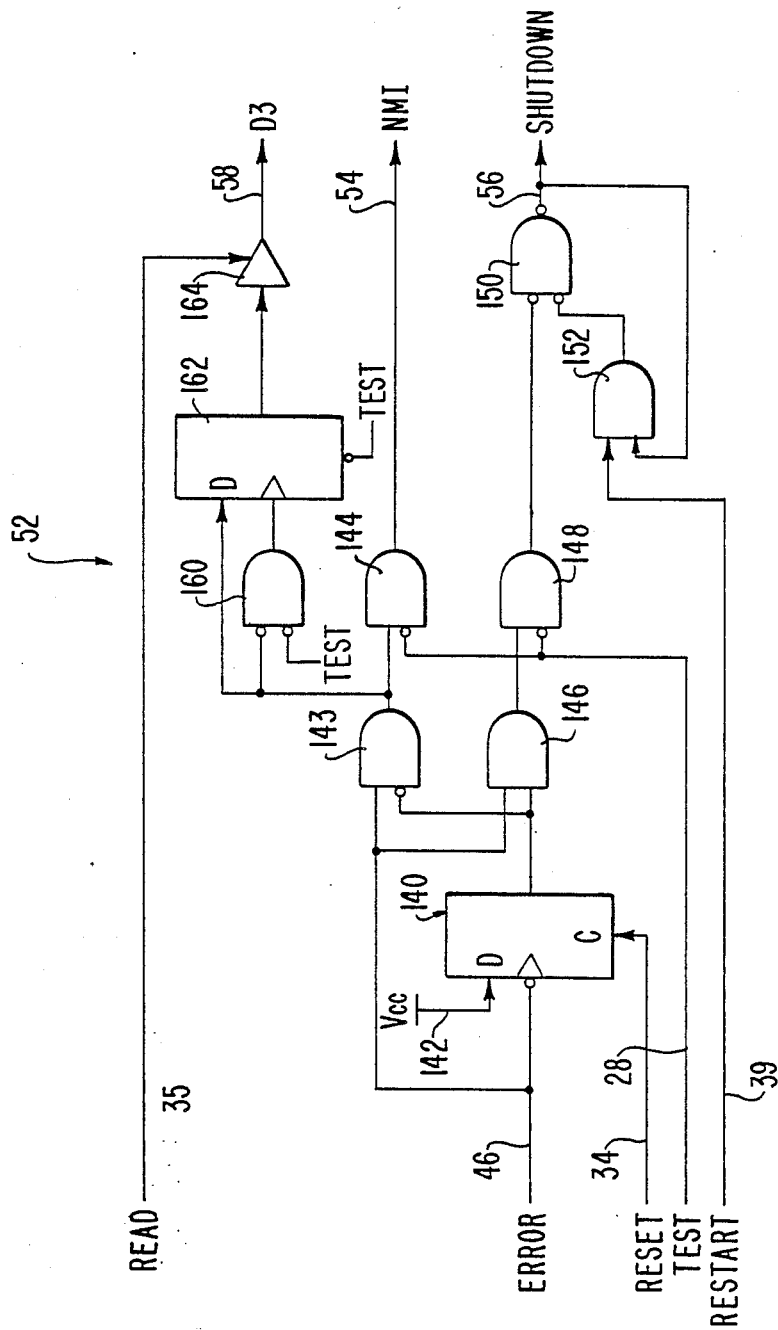
FIG. 6 is a block diagram of a fault level decoder (FLD) of FIG. 2.

FIG. 6 illustrates the FLD 52 of FIG. 2. The NMI signal is produced by the combination of latch 140, AND gate 143 and AND gate 144. During normal operation, the output of latch 140 is low causing AND gate 143 to be enabled via its inverting input. When the first ERROR signal occurs, it will pass through AND gate 143 and AND gate 144, because the TEST signal is low, causing an NMI signal on line 54. However, the falling edge of the first ERROR signal will cause latch 140 to be toggled raising its output high. This will disable AND gate 143 and enable AND gate 146. When the second ERROR signal occurs it will pass through AND gate 146 and AND gate 148, because TEST signal is low, causing a SHUTDOWN signal on line 56 to be produced. Since the TEST signal is normally low except during the test interval, the inverting input of AND gate 148 applies a high level input to the AND gate 148 which in combination with the high level input received from the AND gate 146 causes the output of AND gate 148 to go high. NOR gate 150 is caused to go low to generate the SHUTDOWN signal, which is latched due to the feedback of line 56 through AND gate 152. The RESTART signal is applied on line 39 as an input to AND gate 152 to remove a latched SHUT- DOWN signal if required by operation. As a consequence, the output of AND gate 152 is normally low except during restart. Accordingly, a low level input is applied to NOR gate 150 from AND gate 152 during all intervals except during an attempt to restart the generator 14 or during initial powering up of the generator.

The functional capability of the FLD 52 is tested by the combination of AND gate 160, latch 162 and tristate logic circuit 164. When the TEST signal is high on line 28 during the testing interval, output 58 is forced to go high 7.5 microseconds after the presence of the RESET which indicates that NMI signal would have occurred in response to a first ERROR signal. A high signal on D3 indicates that an ERROR SIGNAL has been generated during testing. The tristate logic circuit 164 applies the output from latch 162 to line 58 in response to the READ signal.

While the invention has been described in terms of its preferred embodiments, numerous modifications may be made thereto without departing from the spirit and scope of the invention as defined in the appended claims.

What is claimed:

1. A testing system for a watchdog timer monitoring a programmed processor and associated with a system which is controlled by a control program executed by the programmed processor and which is monitored by a supervisory system with the watchdog timer generating an interruption signal which interrupts execution of the control program when the watchdog timer does not generate a reset comprising:
    means contained in the supervisory system coupled to the watchdog timer for initiating testing of the watchdog timer; and
    means contained in the watchdog timer for disabling the generation of the interruption signal during testing of the watchdog timer.

2. A testing system for a watchdog timer in accordance with claim 1 further comprising:
    means coupling the watchdog timer to the supervisory system for transmitting a signal representing results of the testing of the watchdog timer to the supervisory system.

3. A testing system for a watchdog timer monitoring a programmed processor and associated with a system which is controlled by a control program executed by the programmed processor and which is monitored by a supervisory system with the watchdog timer generating an interruption signal which interrupts execution of the control program when the watchdog timer does not generate a reset comprising:
    means contained in the supervisory system coupled to the watchdog timer for initiating testing of the watchdog timer; and
    means contained in the watchdog timer for disabling the generation of the interruption signal during testing of the watchdog timer;
    wherein the watchdog timer further comprises;
    means for shutting down the system which is controlled by the control program when the control program does not resume normal operation in response to an interruption signal; and wherein
    the watchdog timer has means for disabling the means for shutting down the system which is controlled by the control program during testing of the watchdog timer.

4. A testing system for a watchdog timer in accordance with claim 2 further comprising:
    means coupling the watchdog timer to the supervisory system for transmitting a signal representing results of the testing of the watchdog timer to the supervisory system.

5. A testing system for a watchdog time in accordance with claim 4 wherein the watchdog timer comprises:
    a decoder, coupled to the programmed processor, for decoding words transmitted from the programmed processor which generates a reset of the watchdog timer in response to decoding a predetermined sequence of words and which is coupled to the means for transmitting a signal to the supervisory system in response to decoding the predetermined sequence of words.

6. A testing system for a watchdog timer in accordance with claim 5 further comprising:
    a reset latch, responsive to a clock signal received from the programmed processor and a data input of a signal indicating that the predetermined sequence of words has been received, for generating the reset in response to a simultaneous occurrence of the clock signal and the signal indicating that the predetermined sequence of words has been received.

7. A testing system for a watchdog timer in accordance with claim 6 wherein the decoder comprises:
    a plurality of gates equal in number to a number of words which are contained in the predetermined sequence with each gate having a plurality of inputs coupled to the programmed processor for respectively receiving bits contained in each word;
    a plurality of latches equal in number to the number of the gates for respectively receiving bits contained in each word, each latch respectively having an input causing any data of a first level which is present on a data input to be latched and an input coupled to the reset generated by the reset latch, each latch having an output with the outputs being coupled to a gate which produces an output signal of a first level in response to outputs from the latches of a first level being simultaneously present, a data input of a first latch of the plurality of latches being coupled to a constant level signal with the output of the first latch being coupled to a data input of a first latch of a group of at least one latch of the plurality of latches with the output of each of the group of latches being coupled to a data input of another of the group of latches except for a last latch within the group which does not have a data output coupled to a data input of a latch in the group of latches;
    a first gate having a pair of inputs with the first input being coupled to the output of the gate which produces the output signal of a first level and a second input being coupled to a signal indicating that the watchdog timer is being tested, the first gate producing an output signal which is the data input of the latch generating the reset signal with the first gate producing a data signal of a first level in response to the signal indicating that the watchdog timer is being tested is not present and the predetermined sequence of words is present;
    a second gate having a pair of inputs with the first input of the second gate being coupled to the output of the gate which produces an output signal of a predetermined level and the second input of the second gate being coupled to the signal indicating that the watchdog timer is being tested and producing an output signal of a first level when both of the inputs have an identical predetermined level; and a test result storing latch having a constant level data input and an input of the output of the second gate for producing an output identical to the data input in response to the output signal of the second gate being the first level and a clear input coupled to the signal indicating that the watchdog timer is being tested for resetting the test result storing latch at an end of the signal indicating that the watchdog timer is being tested, the output of the test result storing latch being coupled to the means for transmitting.

8. A testing system for a watchdog timer in accordance with claim 4 further comprising:

means, responsive to a means for generating the interruption signal, for providing a signal to the means coupling the watchdog timer to the supervisory system to signal the supervisory system of the generation of an interruption signal and signalling the supervisory system if a malfunction exists during testing of the means for generating the interruption signal and disabling the means for generating the interruption signal during testing.

9. A testing system for a watchdog timer monitoring a programmed processor and associated with a system which is controlled by a control program executed by the programmed processor and which is monitored by a supervisory system with the watchdog timer generating an interruption signal which interrupts execution of the control program when the watchdog timer does not generate a reset comprising:

means contained in the supervisory system coupled to the watchdog timer for initiating testing of the watchdog timer;

means contained in the watchdog timer for disabling the generation of the interruption signal during testing of the watchdog timer; and means coupling the watchdog timer to the supervisory system for transmitting a signal representing results of the testing of the watchdog timer to the supervisory system;

wherein the watchdog timer comprises a decoder, coupled to the programmed processor, for decoding words transmitted from the programmed processor which generates a reset of the watchdog timer in response to decoding a predetermined sequence of words and which is coupled to the means for transmitting a signal to the supervisory system in response to decoding the predetermined sequence of words.

10. A testing system for a watchdog timer in accordance with claim 9 further comprising:

a reset latch, responsive to a clock signal received from the programmed processor and a data input of a signal indicating that the predetermined sequence of words has been received, for generating the reset in response to a simultaneous occurrence of the clock signal and the signal indicating that the predetermined sequence of words has been received.

11. A testing system in accordance with claim 10 wherein the decoder comprises:

a plurality of gates equal in number to a number of words which are contained in the predetermined sequence with each gate having a plurality of inputs coupled to the programmed processor for respectively receiving bits contained in each word;

a plurality of latches equal in number to the number of the gates for respectively receiving bits contained in each word, each latch respectively having an input causing any data of a first level which is present on a data input to be latched and an input coupled to the reset generated by the reset latch, each latch having an output with the outputs being coupled to a gate which produces an output signal of a first level in response to outputs from the latches of a first level being simultaneously present, a data input of a first latch of the plurality of latches being coupled to a constant level signal with the output of the first latch being coupled to a data input of a first latch of a group of at least one latch of the plurality of latches with the output of each of the group of latches being coupled to a data input of another of the group of latches except for a last latch within the group which does not have a data output coupled to a data input of a latch in the group of latches;

a first gate having a pair of inputs with the first input being coupled to the output of the gate which produces the output signal of a first level and a second input being coupled to a signal indicating that the watchdog timer is being tested, the first gate producing an output signal which is the data input of the latch generating the reset signal with the first gate producing a data signal of a first level in response to the signal indicating that the watchdog timer is being tested is not present and the predetermined sequence of words is present;

a second gate having a pair of inputs with the first input of the second gate being coupled to the output of the gate which produces an output signal of a predetermined level and the second input of the second gate being coupled to the signal indicating that the watchdog timer is being tested and producing an output signal of a first level when both of the inputs have an identical predetermined level; and a test result storing latch having a constant high level data input and an input of the output of the second gate for producing an output identical to the data input in response to the output signal of the second gate being the first level and a clear input coupled to the signal indicating that the watchdog timer is being tested for resetting the test result storing latch at an end of the signal indicating that the watchdog timer is being tested, the output of the test result storing latch being coupled to the means for transmitting.

12. A testing system for a watchdog timer in accordance with claim 9 further comprising:

means, coupled to the decoder, for controlling the interruption of the control program with the interruption signal being produced when a reset signal is not produced inside a time window measured with respect to a previous reset pulse.

13. A testing system for a watchdog timer in accordance with claim 12 further comprising:

means, coupled to the means for transmitting, for signalling the supervisory system when a reset pulse is generated before the time window; and means, responsive to the means for initiating testing, for disabling the means for signalling the supervisory system when a reset pulse is generated before the time window and signalling the supervisory system if a malfunction exists during testing of the means for signalling the supervisory system when a reset pulse is generated before the time window.

14. A testing system for a watchdog timer in accordance with claim 13 wherein the means for disabling and signalling comprises:
a time window gate having a pair of inputs and an output, the first input having a first level in response to a reset pulse being produced before the time window and a second level in response to a reset not occurring before the time window, the second input being a first level in response to a reset not occurring by an end of the time window, the output being a first level when either a reset occurs before the time window or not occurring by an end of the time window.

15. A testing system, for a watchdog timer in accordance with claim 12 comprising:
means, coupled to the means for transmitting, for signalling the supervisory system when a reset pulse is generated after the time window; and
means, responsive to the means for initiating testing, for disabling the means for signalling the supervisory system when a reset pulse is generated after the time window and signalling the supervisory system if a malfunction exists during testing of the means for signalling the supervisory system when a reset pulse is generated after the time window.

16. A testing system for a watchdog timer in accordance with claim 15 wherein the means for disabling and signalling comprises:
a time window gate having a pair of inputs and an output, the first input having a first level in response to a reset pulse being produced before the time window and a second level in response to a reset not occurring before the time window, the second input being a first level in response to a reset not occurring by an end of the time window, the output being a first level when either a reset occurs before the time window or not occurring by an end of the time window.

17. A testing system for a watchdog timer in accordance with claim 9 further comprising:
means, coupled to the means for transmitting, for signalling the supervisory system when a reset pulse is generated before the time window;
means, responsive to the means for initiating testing, for disabling the means for signalling the supervisory system when a reset pulse is generated before the time window and signalling the supervisory system if a malfunction exists during testing of the means for signalling the supervisory system when a reset pulse is generated before the time window;
means, coupled to the means for transmitting, for signalling the supervisory system when a reset pulse is generated after the time window; and
means, responsive to the means for initiating testing, for disabling the means for signalling the supervisory system when a reset pulse is generated after the time window and signalling the supervisory system if a malfunction exists during testing of the means for signalling the supervisory system when a reset pulse is generated after the time window.

18. A testing system for a watchdog timer in accordance with claim 17 further comprising:
a time window gate having a pair of inputs and an output, the first input having a first level in response to a reset pulse being produced before the time window and a second level in response to a reset not occurring before the time window, the second input being a first level in response to a reset not occurring by an end of the time window, the output being a first level when either a reset occurs before the time window or not occurring by an end of the time window.

19. A testing system for a watchdog timer monitoring a programmed processor and associated with a system which is controlled by a control program executed by the programmed processor and which is monitored by a supervisory system with the watchdog timer generating an interruption signal which interrupts execution of the control program when the watchdog timer does not generate a reset comprising:
means contained in the supervisory system coupled to the watchdog timer for initiating testing of the watchdog timer; and
means contained in the watchdog timer for disabling the generation of the interruption signal during testing of the watchdog timer;
wherein the system which is controlled by the control program is an electrical power generator in an airframe.

20. A testing system for a watchdog timer in accordance with claim 19 wherein:
the supervisory system is a bus control unit.

21. A testing system for a watchdog timer which monitors the operation of a programmed processor with the watchdog timer having means for generating an interruption signal to interrupt execution of a program by the programmed processor comprising:
means, coupled to the watchdog timer, for initiating testing of the watchdog timer; and
means for disabling generation of the interruption signal by the means for generating the interruption signal during testing of the watchdog timer.

22. A testing system for a watchdog timer which monitors the operation of a programmed processor with the watchdog timer having means for generating an interruption signal to interrupt execution of a program by the programmed processor comprising:
means, coupled to the watchdog timer, for initiating testing of the watchdog timer;
means for disabling generation of the interruption signal by the means for generating the interruption signal during testing of the watchdog timer;
a system which is controlled by the program executed by the programmed processor; and
means for shutting down the system which is controlled by the program when the program does not resume normal operation in response to an interruption signal; wherein:
the watchdog timer has means for disabling the means for shutting down the system which is controlled by the program during testing of the watchdog timer.

23. In a system including a watchdog timer and a programmed processor, a method of monitoring the programmed processor comprising the steps:
transmitting a signal from the programmed processor to the watchdog timer;
generating an interruption signal in the watchdog timer when the transmitted signal indicates that the programmed processor is not operating normally, said interruption signal interrupting execution of a program by the programmed processor;
initiating testing of the watchdog timer; and disabling generation of the interruption signal by the watchdog timer during the testing of the watchdog timer so that during the testing the watchdog timer does not generate an interruption signal even if the transmitted signal indicates that the programmed processor is not operating normally.

24. A method of monitoring a programmed processor according to claim 23, further comprising the steps:

shutting down a system which is controlled by the program executed by the programmed processor when the program does not resume normal operation in response to the interruption signal; and disabling the shutting down of the system which is controlled by the program during the testing of the watchdog timer.

* * * * *